United States Patent Office 3,353,555
Patented Nov. 21, 1967

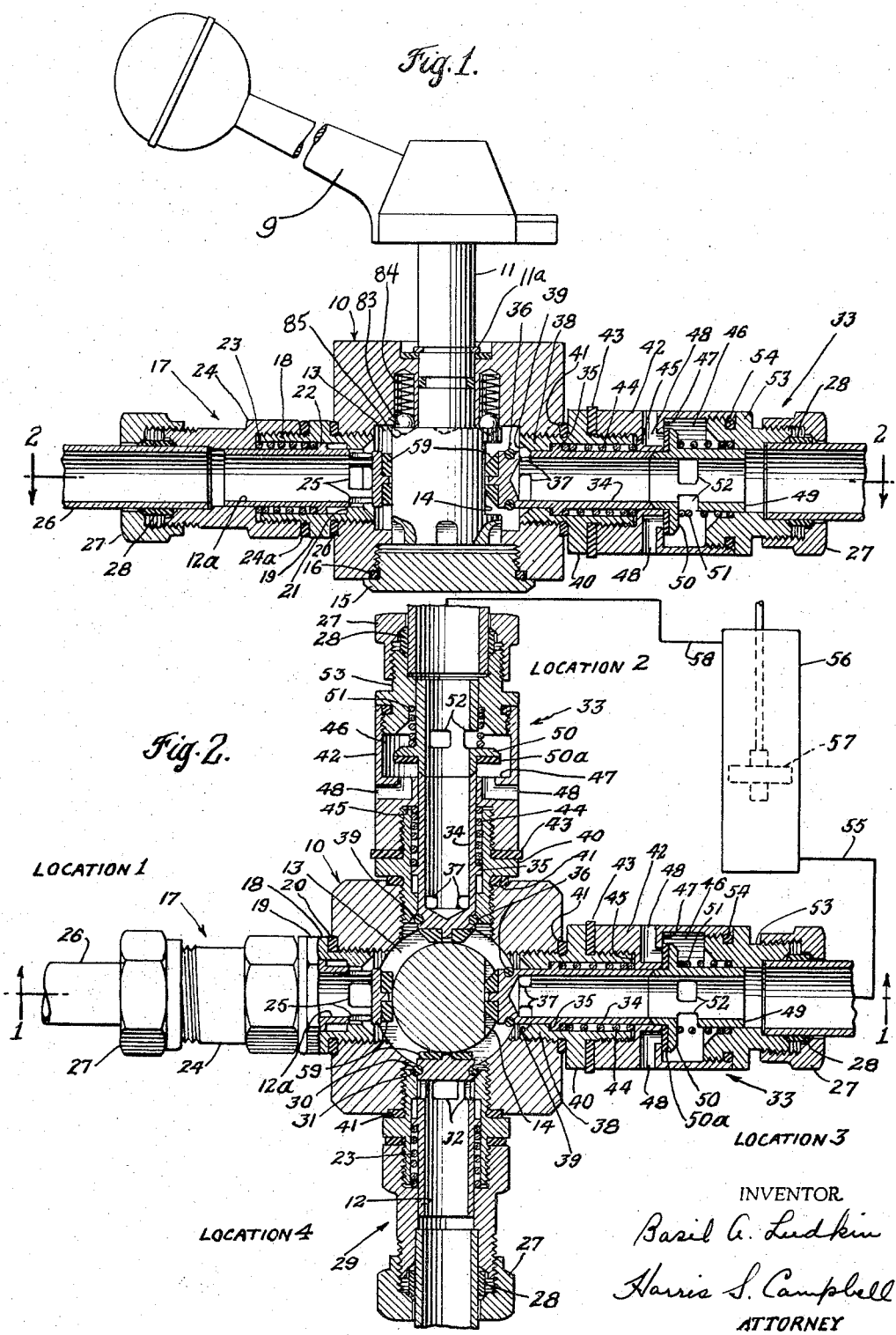

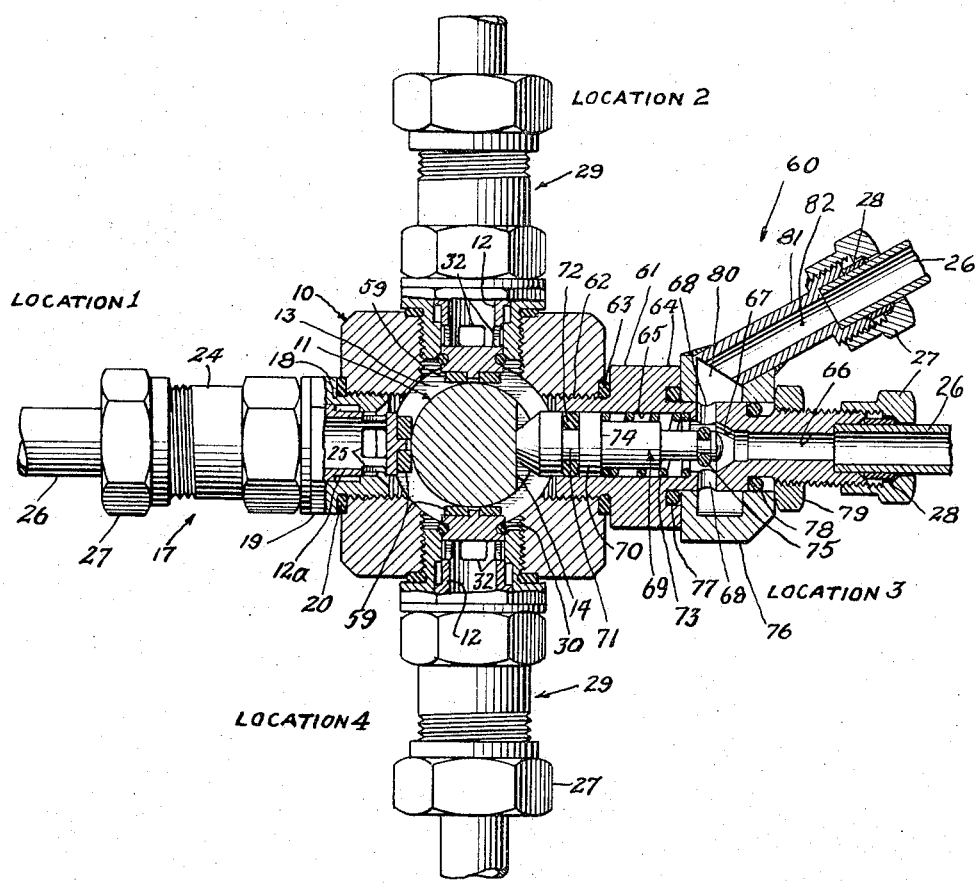

3,353,555
MULTIPLE CIRCUIT CONTROL VALVE
Basil A. Ludkin, Caterham, England, assignor of one-half each to Drallim Industries Limited, Upper Warlingham, England, a British company, and Angus W. Millard, Godstone, England
Filed Sept. 15, 1965, Ser. No. 487,491
13 Claims. (Cl. 137—596.2)

ABSTRACT OF THE DISCLOSURE

This specification is concerned with rotary selector valves. Under customary circumstances in valves of this nature, by moving the control spindle, a connector valve assembly may be connected in a desired fashion with the common central chamber and thence to another connector assembly.

By providing special connector assemblies of two further types more complex and varied circuits may be accommodated. One special connector assembly may provide for connection only between two parts of an external or isolated circuit at a selected position of the selector valve control. The second special connector assembly permits either connection in the standard manner to another circuit through the chamber of the selector valve in one position of the valve control and in another position of the valve control the second special connector assembly provides for connection of a venting circuit.

---

This invention relates to selector valves and represents an improvement applicable to the type of valve disclosed in Millard Patent 3,128,788 issued Apr. 14, 1964, and in my copending application, Ser. No. 487,492 filed Sept. 15, 1965.

Valves of the type to which this improvement applies provide for connecting a source of fluid under positive or negative pressure to a plurality of delivery channels in a selective fashion to accomplish the desired functions. Under some circumstances it will be advantageous to be able to provide additional valve capabilities, so that fluid from another source can be controlled to allow flow to accomplish its function without flowing through the main chamber of the valve. These additional functions may be controlled by the normal operation of the valve.

The primary object of the invention is to provide valve improvements which will increase the versatility of a selector type valve and will allow the use of a relatively simple valve to perform a greater variety of operations, and thus be useful in more complicated systems than heretofore.

A more specific object of the invention is the provision of a connector or insert assembly which may be mounted in one of the ports in the main valve body, which assembly incorporates mechanism to open and close a channel other than the channel leading to the chamber in the main valve body.

A still more specific object is the provision of a connector assembly, which incorporates a normal delivery passageway when in the "open" position and another flow channel to permit bleed from the passageway when the connector assembly is in "closed" position.

Another specific object is to provide a connector assembly which is closed from the main valve chamber, but which is controlled at one valve position to provide an isolated connection between an inlet and outlet independent of other connector assemblies.

How these and other objects and advantages are accomplished will be clear by reference to the drawings in which:

FIGURE 1 is a sectional elevation through a valve constructed according to the present invention, the view being taken in the direction of arrows 1—1, FIGURE 2.

FIGURE 2 is a sectional view taken through the valve in the direction of arrows 2—2, FIGURE 1.

FIGURE 3 is a sectional view similar to FIGURE 2, but taken through a valve having a different connector assembly associated with the main valve body.

Referring to FIGURES 1 and 2, there is shown a selector valve having a main body 10 into which extends operating spindle 11 which is rotatable to actuate the valve members 12, 12a, 34, for opening and closing the valve fluid circuits. A central cavity is formed in the valve body between the spindle 11 and the inner wall of the valve body 10 to form a valve chamber 13. The lower part of spindle 11 is located within the chamber 13 and is formed with flat or cam surface 14. The lower end of the valve chamber 13 is closed by a plug 15, which is threaded into the main body 10 with a seal member 16 to prevent leakage. Handle 9 permits rotation of spindle 11 and snap ring 11a retains spindle 11 in axial position.

In the valve arrangement illustrated in FIGURE 2, there are four port outlets disposed in radial fashion around the valve body 10 in a plane perpendicular to the axis of the spindle 11. They are marked, Location 1, 2, 3 and 4. Location 1 represents a connector valve unit assembly suitable for an inlet channel. Locations 2 and 3 show assemblies having special features suitable for use under some circumstances. Location 4 illustrates a connector assembly suitable for a normal outlet or delivery channel.

The connector assembly 17 at Location 1 incorporates an open channel or dummy valve member 12a, which is supported in an inner connector member 18 which in turn is in threaded engagement with the main valve body 10. Connector member 18 has a flange 19 which applies pressure to the sealing ring 20. The inner end of the connector member 18 has an inwardly directed flange 21, which serves as a limit stop for the flange 22 on the valve member 12a. A spring 23 is held in position by the outer connector member 24 which is threaded to the inner connector member 18 and provides a shoulder against which the spring 23 reacts to urge the valve body 12a inwardly. At the inner end of valve member 12a which is in the form of a sleeve open at its outer end and closed at its inner end, there is a peripheral port or ports 25. Port 25 is proportioned so that whether the valve member 12a is moved to its outer or its inner position, an open connection is established between the inner sleeve of the valve member 12a and the main valve chamber 13. To provide for the connection of a suitable pipe or tube 26, a cap member 27 is threaded to the outer end of the outer connector member 24, and is arranged to apply pressure to the short sleeve 28 which is made of deformable material, such as artificial rubber and which when compressed applies pressure to the outside of tube 26 to seal it and hold it in position.

At Location 4, connector assembly 29 provides for an outlet passageway or delivery channel. Connector assembly 29 is generally similar to connector assembly 17, except that the valve member 12 in assembly 29 is somewhat different from the valve member 12a in assembly 17. The inner end of the valve sleeve member 12 is closed and just adjacent the end of the valve is a groove with a sealing ring 30, which is arranged to engage the bevelled seat 31 when the valve is in its outer radial position as shown in FIGURE 2. Peripheral port 32 which is just radially outward from the sealing ring 31, is ineffective when the valve 12 is in the outer position. However, when the cam surface 14 is turned into position opposite the valve assembly 29, the spring 23 urges the valve member 12 inwardly until the sealing ring 30 lifts off the seat 31, and the port 32 in this position forms a connection between the inside of the sleeve 12 and the valve chamber 13. As will be noted, the other parts of the connector valve assembly 29 are identical with those of connector assembly 17.

At each Location 2 and 3 in FIGURE 2, a connector assembly 33 is shown. These two assemblies are the same, the one at Location 2 being shown in the closed position of the valve and the one at Location 3 being shown in the open or delivery position. As in the case of connector assembly 29, the assembly 33 incorporates a generally similar shaped valve sleeve member 34 having flange 35, sealing ring 36 and peripheral port 37. The inner connector member 38 is equipped with a bevel seat 39, and flange 40 engages the sealing ring 41 to urge it into contact with the valve body 10. A center connector member 42 is attached to the inner connector member 38 by a threaded connection and seal 43 is interposed between these parts. A spring 44 reacts against the flange 35, to urge the valve member 34 inwardly. Spring 44 engages the surface 45 of the connector member 42. The outer portion of the center connector member 42 has a peripheral chamber 46, the inner end of the chamber being defined by surface 47. In the surface 47 are several small ports 48, which lead from chamber 46 to the outside of the connector assembly 33. An outer sleeve valve member 49 extends into engagement with and in line with the inner sleeve member 34. An external flange 50 projects around the sleeve member 49 into the chamber 46. A spring 51 urges the sleeve valve member 49 inwardly, so that it will follow the movement of the inner sleeve valve member 34. Ports 52 provide passageways in the wall of the sleeve valve member 49 to allow communication between the inner sleeve channel or passageway and the chamber 46. A resilient washer or seal 50a is positioned on the inner side of the flange 50 and proportioned so that it will cover the ports 48 where they emerge through the surface 47 into chamber 46. An outer connector part 53 assists in the support of the outer sleeve valve part 49 and is in threaded engagement with the center connector member 42, a sealing member 54 being provided to prevent leakage between the two parts. Suitable tube connecting parts similar to those shown in connector assemblies 17 and 29 may be provided to transfer fluids which pass through the valve system.

With the arrangement shown in FIGURE 2, the cam section 14 is in alignment with the connector assembly 33 at Location 3. In this position fluid such as, for example, compressed air, will be admitted through the dummy valve assembly at Location 1, and transmitted through the open valve at Location 3. In the open position the valve members 34 and 49 are urged to their radially inward positions, so that the inner seal 36 is remote from the seat surface 39 to allow port 37 to pass fluid from the valve chamber 13 into the passage inside the valve device consisting of sleeve valve members 34 and 49. In this position the ports 48 are sealed so that the compressed air moves upwardly through the tube 26 and may be used for example to deliver compressed air to the line 55 leading to cylinder 56. Here it will operate to move the piston 57 upwardly as viewed in FIGURE 2. To allow free movement of the piston 57, the air on the piston rod end of the piston 57 must be permitted to escape through line 58, which is connected to the connector assembly 33 at Location 2. With the spindle 11 position shown in FIGURE 2, the seal 36 is in closed position with respect to seat 39 while the seal 50a is moved away from the ports 48 to permit communication between chamber 46 and outlet ports 48. Thus the air being forced back through the line 58 can escape through bleeder ports 48 to the outside while being prevented access to the valve chamber 13.

Movement of the valve spindle to place the cam section 14 in line with the connector assembly 33 at Location 2, will thus open the valve at Location 2 and close the valve at Location 3, to allow delivery of compressed air through the line 58 to the rod end of the piston 57 while permitting bleeding of the air from the closed end of the cylinder 56 through line 55 to bleed out through the ports 48 at Location 3.

The two piece construction of the valve device, sleeve valve members 34 and 49, is desirable for easy assembly. In addition proper operation is obtained more readily. To assure that the outer bleeder aperture 48 is fully closed it is required that the movement of the outer sleeve 49 be the same or even slightly less than the movement of inner sleeve 34. This condition may be readily attained with the two piece construction.

Movement of the spindle 11 so that the cam section 14 is in line with Location 4 will permit delivery of compressed air to another point where it may be needed to perform a desired function. In some instances, it may be desirable to operate two double acting cylinders from a single valve. In this case, Locations 1 and 4 may also be equipped with connector assemblies 33 and a compressed air connection made into the valve body through the plug 15. Alternatively a six port valve may be used with one port blocked.

With the arrangement of FIGURE 2, the spindle may be moved until cam section 14 is in alignment with Location 1. In this position all passageways are closed with no fluid flow occurring.

A disk 59 of low friction material is mounted at the inner end of each valve member 12, 12a and 34 to improve the operation of the valve. To more definitely indicate the operating positions of the valve, indexes in the form of balls 83, springs 84 and depressions 85, are provided as shown in FIGURE 1.

In FIGURE 3 there is shown a somewhat different arrangement of valve connector assemblies. As in the case of FIGURE 2, a dummy valve connector assembly 17 is shown at Location 1. At Locations 2 and 4 the more normal connector assemblies 29 are shown similar to that at Location 4 in FIGURE 2. Using connector assemblies 29 an inlet passageway through 12a may be selectively connected to an outlet passageway at either Location 2 or Location 4. The connector assembly 60 at Location 3 provides for a somewhat different condition.

Connector assembly 60 includes a main connector member 61 having a threaded terminal 62 to connect into the valve body 10 with seal 63 interposed between valve body 10 and connector member 61. Connector member 61 has a heavy external flange portion 64 and an internal cylindrical bore with a large diameter inner portion 65 and a smaller diameter outer passageway 66 with a tapered seat 67 between the cylindrical portions. Located near but inwardly from the seat 67 are apertures 68 in the wall of the connector member 61.

Mounted for axial movement in the inner bore 65 is a valve body 69 with its inner portion 70 enlarged to fit the bore 65. A groove 71 retains sealing ring 72 which effectively seals against passage of fluid between valve chamber 13 and bore 65. A spring 73 reacts against shoulder 74 to urge valve body 69 inwardly. At the outer end of valve body 69, a seal 75 is supported to move into or out of engagement with tapered seat 67 depending on the axial position of the valve body 69.

As part of the connector assembly 60, a large body member 76 is mounted over the connector member 61 outward from the flange 64. A cylindrical opening in member 76 fits around connector member 61 and sealing rings 77 and 78 prevent leakage of fluid past the connection. A nut 79 retains the member 76 in position. An annular cavity 80 is provided in member 76 and apertures 68 connect into this cavity 80. Extending at an angle to body 76 and connected to it is a tubular member 81 forming a passage 82 connecting with cavity 80. Suitable tube connectors as shown at 27 and 28 may be used at the outer ends of connector member 61 and tubular member 81 to transfer fluid to the desired location.

Control of the valve arrangement of FIGURE 3 is accomplished by rotating spindle 11 to various positions. With the cam surface 14 in positon adjacent Location 3 as shown, the valve connector assemblies 29 of Locations 2 and 4 are closed so no fluid flow occurs through them. The connector assembly 60 at Location 3 is in "open" position as illustrated, but no flow can occur between the valve chamber 13 and the passageway at Loaction 3 because of seal 72. However, in this position of valve body 69 the outer seal 75 is away from seat 67 permitting flow past it. Fluid flow can then occur between inlet channel or passage 66 and outlet passage 82 to provide an external fluid circuit independent of the fluid in the main valve body. This isolated or external circuit may use different fluid, but with this valve construction the control is automatically integrated with the control of the other circuits.

Movement of spindle 11 so that flat 14 is adjacent Location 2 will close the valve member 69 by seating the outer seal 75 in seat 67. The connector assembly at Location 2 will be opened to allow fluid flow to it from inlet assembly 17 which is open due to the dummy valve 12a. Similarly movement of the spindle 11 to a position with the flat 14 at Location 4 will close the Location 2 and 3 assemblies and open the flow between the Location 4 assembly and Location 1. Movement of flat 14 to the Location 1 position will close the connector assemblies at Locations 2, 3 and 4, with the result that there is no flow through any of the circuits.

It will be evident that the improved combination using multiple purpose connector assemblies, the versatility and usefulness of multiple port, radial flow selector valves is materially extended. These improved connector assemblies may obviously be applied to valve units having more or less than four outlets and in units having more than one bank of outlets.

With the special connector assemblies, additional functions can be accomplished at one connection besides providing a selected delivery channel. By using one form normal delivery can be made through the connector at one control position, while at another control position a different flow through another outlet may be made at the same connector assembly. Using another form of connector assembly a fully independent fluid circuit may be controlled at one position of the control. Or if desired, more than one isolated circuit connector may be included. Use of these connector assemblies allows the solution of complicated fluid circuits with less complicated valve equipment.

I claim:
1. A selector valve construction having
 (a) a main body having a central chamber and a plurality of radially disposed ports,
 (b) a spindle in said chamber having its axis perpendicular to the plane of said ports and having a cam section in alignment with said ports,
 (c) each of said ports having a connector assembly mounted therein,
 (d) one of said connector assemblies having
   (1) a connector member attached to said body and having a cylindrical cavity,
   (2) a valve device radially movable to an inner or outer position in said cavity by rotation of said spindle,
   (3) a spring reacting against said device to urge it inwardly,
   (4) a sealing ring engaging said valve device near its inner end and a second sealing ring engaging said valve device at an outer location,
   (5) a radially directed fluid passageway in said connector assembly, connecting with a radially extending pipe,
   (6) said connector assembly having a wall with an aperture near the sealing ring at the outer location, said aperture connecting to a passage leading outside said connector assembly,
   (7) movement of said valve device in one direction serving to open said aperture to connect said fluid passageway with said passage to the outside and movement in the other direction closing said aperture between said passageway and said passage thus providing for control of an external circuit independent of the flow circuits in said valve chamber.

2. A selector valve construction having
 (a) a main valve body with a valve chamber and a rotatable spindle mounted therein, said spindle having a cam section,
 (b) a plurality of connector assemblies radially positioned on said body, one of said connector assemblies having
   (1) a valve device radially movable by rotation of said spindle,
   (2) a seal near the inner end of said valve device and a seal spaced radially outward from the inner seal,
   (3) a fluid passage in said connector assembly,
   (4) a channel opening in a wall of said connector assembly connecting with said fluid passage, movement of said valve device to one of its positions causing said outward seal to close the channel opening from the fluid passage, thereby providing for control of flow in an external fluid circuit independent of said valve chamber,
 (c) another one of said connector assemblies having
   (1) a different valve device radially movable by rotation of said spindle,
   (2) a ring seal on said device,
   (3) a seat in said connector assembly against which said seal engages in one of its positions,
   (4) a fluid passage extending radially through said connector assembly,
   (5) movement of said valve device to one of its positions providing for release of said seal from said seat thus providing for control of flow in an internal circuit through said valve chamber.

3. A selector valve construction having
 (a) a main valve body,
 (b) a spindle having a cylindrical surface with a cam section supported for rotation in said body,
 (c) a valve chamber formed between the outer surface of said chamber and the inner surface of said valve body,
 (d) a plurality of valve connector assemblies extending in radial fashion around said valve body, one of said assemblies having
   (1) a valve device mounted therein for radial outward movement when said spindle is moved from a position with its cam section in alignment with said device to a position with its cylindrical surface in contact with said device,
   (2) a spring reacting against said valve device to urge it inwardly,
   (3) a sealing element near the inner end of said device and a sealing element outwardly spaced from the inner end,
   (4) a fluid passage in said connector assembly,
   (5) said connector assembly including a connector member with an aperture near said outer sealing element in connected relationship with said fluid passage in one position of said valve device and in closed relationship with said fluid passage in the other position of said valve device,
   (6) said inner seal serving to close said passage from said valve chamber when said aperture is in connected relationship with said passage thereby providing for an external circuit independent of the valve chamber in one position of the control spindle.

4. A selector valve construction according to claim 3 in which said inner seal moves to open said passage to said valve chamber when said aperture is in closed relationship with said passage thereby providing an alternate internal circuit through the valve chamber for a second position of the control spindle.

5. A selector valve construction having
   (a) a main body having a plurality of radial ports,
   (b) a rotatable control spindle mounted in said main body having a cam section,
   (c) a valve chamber between said spindle and said main body,
   (d) connector assemblies mounted in said ports, one of said assemblies having
      (1) a sleeve assembly having a threaded attachment to said valve body and a cylindrical passage extending radially therein, said sleeve assembly having an annular chamber extending around it with a channel opening from said annular chamber to the outside of said sleeve assembly,
      (2) a valve device of hollow sleeve construction mounted in said passage, the inner end of said device being closed, a sealing member around its inner end, a peripheral port in the wall adjacent said sealing member, a flange on said device at an outer position, a seal associated with said flange, a second peripheral port in said device adjacent said annular chamber,
      (3) said channel being closed by said flange and associated seal when said valve device is moved to its inward position, and said inner sealing member being moved to open position away from said seat to provide flow between the inside of said valve device and said valve chamber,
      (4) said valve device being movable by said control spindle to an outer position where said inner seal is seated to cut off flow to the valve chamber, and where said flange associated seal is moved away from said channel to allow bleeding from inside said valve device to the outside of said sleeve assembly.

6. A selector valve construction having
   (a) a main valve body having a valve chamber and a plurality of radial ports,
   (b) a control spindle having a cylindrical shape with a flat cam section mounted for rotation in said valve body,
   (c) a connector assembly mounted in each of said ports, one of said assemblies having
      (1) an external housing having a bevelled seat at its inner end, a peripheral chamber at an outer position and an outlet from said chamber through the outer wall of said housing,
      (2) a movable hollow sleeve device mounted in said housing, the inner end of said sleeve device being closed and having a sealing ring mounted thereon, said sleeve device having a port in its wall near said sealing ring, the outer portion of said sleeve device having a flange thereon extending into the peripheral chamber and an opening in the sleeve device wall opposite said chamber, a seal supported on said flange in position to cover said outlet,
      (3) a spring reacting against said sleeve device to urge it inwardly,
      (4) said sleeve device being movable by said spindle to an outer position where the inner end is sealed against transfer of fluid from the valve chamber to said hollow sleeve device and the outer flange seal is in open position to permit bleeding of fluid from said hollow sleeve device to the outside of said external housing,
      (5) said sleeve device also being movable by rotation of said spindle to an inward position in which the outer wall outlet is sealed against bleeding and the inner seal is removed from the bevelled seat to permit flow between said valve chamber and said sleeve device.

7. A selector valve construction having
   (a) a main body having radially disposed ports, and a valve chamber,
   (b) a control spindle mounted in said body,
   (c) a connector assembly mounted in one of said ports having
      (1) a multipart housing having a seal seat near its inner end, a bleed aperture located outwardly from said seat and means for connecting a fluid conduit at its outer end,
      (2) a valve device having an inner movable hollow sleeve supported in said housing and having a closed inner end with a seal supported thereon, the wall of said sleeve having a port adjacent the closed end,
      (3) said valve device also having an outer movable hollow sleeve supported in said housing, a seal attached to said sleeve and adapted to close said bleed aperture, said outer sleeve having a port therein to form a channel from the interior of the sleeve to its outside,
      (4) a spring reacting against the inner sleeve to urge it inwardly,
      (5) a separate spring reacting against the outer sleeve to urge it inwardly,
   (d) movement of said spindle to one position providing for inward movement of both sleeves to open said inner end seal and close said bleeder aperture to provide a flow channel between said valve chamber and the outer end of said housing,
   (e) movement of said spindle to another position causing outward movement of both sleeves to close said inner end seal and open said bleeder aperture to permit flow from a connecting conduit through said bleeder aperture to the outside of said housing.

8. A selector valve construction having
   (a) a main body having a valve chamber and a plurality of radially disposed ports,
   (b) a control spindle mounted for rotational movement in said body and having a cam section in alignment with said ports,
   (c) a connector assembly in one of said ports having
      (1) a housing having a cylindrical cavity at its inner end and a passage extending outwardly to conduit connecting means, said housing having an aperture in the wall and a sealing seat located between said aperture and said passage,
      (2) A movable valve member mounted in said cylindrical cavity, a seal acting between the inner end of said valve member and said cavity to prevent flow between said valve chamber and said housing passage, a sealing member at the outer portion of said valve member adapted to engage said sealing seat,
      (3) a spring urging said valve member inwardly,
      (4) another housing part having a passage connecting with said aperture and extending to a second conduit connecting means,
      (5) movement of said valve member to one position causing opening of said sealing seat and sealing member to permit flow through said aperture from the passage in the first housing to the passage in the other housing part, and movement of said valve member to another position causing closing between said seat and sealing member to prevent flow through said aperture.

9. For a selector valve with a plurality of connector assemblies arranged in radial fashion, a connector assembly having (a) a housing part having a cylindrical cavity and a cylindrical passage with tapered seat therebetween and an aperture leading through the wall of said part and located inwardly from said seat,
(b) a second housing part supported on said first housing part having a passage leading therethrough, said passage being connected to said aperture,
(c) conduit attaching means at the end of the passages of both housing parts,
(d) a movable valve member supported in the cylindrical cavity of the first housing part,
(e) a sealing ring supported in said valve member near its inner end,
(f) a seal supported near the outer end of said valve member adapted to engage said tapered seat when the valve member is moved to its outer position,
(g) a spring mounted in said cavity and engaging said valve member to urge it in an inward direction,
(h) said valve member being movable to an inner position where said outer seal is open with respect to said seat to provide a fluid channel between the passages in the two housing parts, said valve member also being movable to an outer position where said outer seal engages said seat and closes the channel between said passages.

10. A selector valve construction having
(a) a body incorporating a valve chamber and a plurality of radially disposed ports therein,
(b) a control spindle mounted in said body and having a cam section in alignment with said ports,
(c) a connector assembly mounted in one of said ports having a movable valve member which may be moved by said spindle to either open or closed position to connect or disconnect a flow passage in said assembly with said valve chamber,
(d) a second connector assembly mounted in another of said ports having a movable valve member which may be moved by said spindle to open or close an independent external fluid circuit which is isolated from said valve chamber.

11. A selector valve construction having
(a) a body incorporating a valve chamber and a plurality of radially disposed ports therein,
(b) a control spindle mounted in said body and having a cam section in alignment with said ports,
(c) a connector assembly in each of two adjacent ports, each of said assemblies having
 (1) a housing structure with a cylindrical channel therethrough, means for connecting a fluid conduit at its outer end, a peripheral chamber, a bleeder aperture from said chamber,
 (2) a sleeve valve device mounted for movement in said housing and having seal means at its inner end for opening or closing the connection between the channel through said housing and said valve chamber, said valve device having a second seal in an outer portion to engage said aperture in one position of the valve device,
 (3) spring means to urge said valve device inwardly,
(d) said spindle being movable to a position where one of said valve devices is moved inwardly to close the bleeder aperture and open the seal means at the inner end while the other valve device is in the opposite position with the inner seal means closed and the bleeder aperture is open,
(e) said spindle being movable to another position where the respective valve devices are reversed.

12. A selector valve construction having
(a) a main valve body including a chamber with a plurality of radially directed ports,
(b) a spindle shaft supported in said body with its axis lying perpendicular to the plane of said ports, said shaft having a flattened cam section in alignment with said ports,
(c) a plurality of said ports each having a connector assembly in threaded engagement therewith,
(d) one of said connector assemblies having
 (1) a sleeve having a threaded connection to said valve body,
 (2) a part attached to said sleeve having an annular chamber with a channel leading therefrom,
 (3) a valve device supported in said sleeve for axial movement and having a seal at its inner end and a second seal at an outer position,
 (4) a radially extending fluid channel connected to said connector assembly,
 (5) a spring reacting against said valve device to urge it inwardly,
 (6) said first seal preventing flow from the fluid channel to the body chamber,
 (7) said valve device and second seal being movable by said spindle to a position in which said radial channel is connected to the channel leading from the annular chamber thus providing for a flow channel isolated from the valve chamber.

13. A selector valve construction having
(a) a body incorporating a valve chamber and a plurality of radially disposed ports therein,
(b) a control spindle mounted in said body and having a cam section in alignment with said ports,
(c) one port having a connector assembly having a fixed sleeve with a bevelled seat at its inner end and a movable valve member in the form of a sleeve with an inner closed end and an annular seal at said closed end engageable with said seat, peripheral ports adjacent said seal immediately outwardly thereof, a fluid connecting channel outwardly of said port,
 (1) a spring urging said sleeve inwardly to open said connecting channel to said valve chamber when the cam portion of said control spindle is moved into alignment,
 (2) a fluid channel leading radially outwardly from said port assembly,
(d) a second port having a connector assembly including a fixed sleeve, an axially movable valve device mounted therein with a peripheral seal element at its inner end,
 (1) a second seal in said valve device located radially outwardly from said peripheral seal,
 (2) an annular chamber adjacent the second seal with another channel leading therefrom, said valve device being movable by said spindle to a position where said second seal is in an open position allowing flow between said radial fluid channel and said other channel to provide a circuit isolated from the valve chamber.

References Cited
UNITED STATES PATENTS

| | | | |
|---|---|---|---|
| 793,308 | 6/1905 | Lewis et al. | 137—636.1 |
| 1,371,795 | 3/1921 | Logan | 137—636.1 |
| 2,395,180 | 2/1946 | Good | 251—263 |
| 2,477,237 | 7/1949 | Carr | 137—596.1 |
| 2,503,827 | 4/1950 | Langmore et al. | 137—596.1 |
| 2,846,845 | 8/1958 | Parker | 137—625.26 X |
| 3,128,788 | 4/1964 | Millard | 251—261 X |

FOREIGN PATENTS 561,628  5/1944  Great Britain.

M. CARY NELSON, *Primary Examiner.*

HENRY T. KLINKSIEK, *Examiner.*